(12) United States Patent
Shu

(10) Patent No.: US 8,022,664 B2
(45) Date of Patent: Sep. 20, 2011

(54) BATTERY CHARGER

(75) Inventor: Wen Shu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 381 days.

(21) Appl. No.: 12/413,586

(22) Filed: Mar. 29, 2009

(65) Prior Publication Data

US 2010/0085007 A1    Apr. 8, 2010

(30) Foreign Application Priority Data

Oct. 6, 2008    (CN) .......................... 2008 1 0304756

(51) Int. Cl.
*H02J 7/00* (2006.01)
*H01R 11/30* (2006.01)

(52) U.S. Cl. ............ 320/107; 320/111; 439/38; 439/39; 439/40

(58) Field of Classification Search .................. 320/111, 320/107; 439/40
See application file for complete search history.

(56) References Cited

U.S. PATENT DOCUMENTS

| 5,931,683 | A * | 8/1999 | Pinel ................................. 439/39 |
| 6,764,373 | B1 * | 7/2004 | Osawa et al. .................. 446/175 |
| 2004/0255425 | A1 * | 12/2004 | Arai et al. ..................... 15/300.1 |

* cited by examiner

*Primary Examiner* — Edward Tso
*Assistant Examiner* — Johali Torres Ruiz
(74) *Attorney, Agent, or Firm* — Altis Law Group, Inc.

(57) ABSTRACT

A battery charger includes a housing, an electrical connector, magnets, and sensors. The electrical connector with a magnet attached thereon is received in the housing. The electrical connector is connected to the rear wall of the housing via an elastic member. The electrical connector is capable of extending out of the housing and through an opening in the housing. Another magnet is secured at a front end of the housing. When an attractive force is induced between the magnets, the electrical connector is extended towards and through the opening in the housing. The sensors are configured for detecting that a robot is in position to be charged and for turning on the attractive force between the magnets.

8 Claims, 2 Drawing Sheets

BATTERY CHARGER

BACKGROUND

1. Technical Field

The present disclosure relates to battery chargers and, particularly, to a battery charger capable of automatically charging a robot.

2. Description of the Related Art

Currently, robots are being employed to do a variety of tasks. Most robots are battery powered. When the battery or batteries are dead, the robots will be non-functional. However, most battery powered robots are capable of plugging themselves into a power source in order to recharge the batteries. Typically, the receptacle is on the robot and the plug is on the battery charger. Because the plug of the battery charger may protrude from the battery charger, the plug is easily damaged by other moving objects and may also be damaged by the robot during connecting and disconnecting.

What is needed, therefore, is a battery charger capable of alleviating the above shortcomings.

BRIEF DESCRIPTION OF THE DRAWINGS

Many aspects of the present battery charger can be better understood with references to the accompanying drawings. The components in the drawing are not necessarily drawn to scale, the emphasis instead being placed upon clearly illustrating the principles of the present battery charger.

DETAILED DESCRIPTION OF THE EMBODIMENTS

Embodiments of the present disclosure will now be described in detail below, with references to the accompanying drawings.

Figure 1:
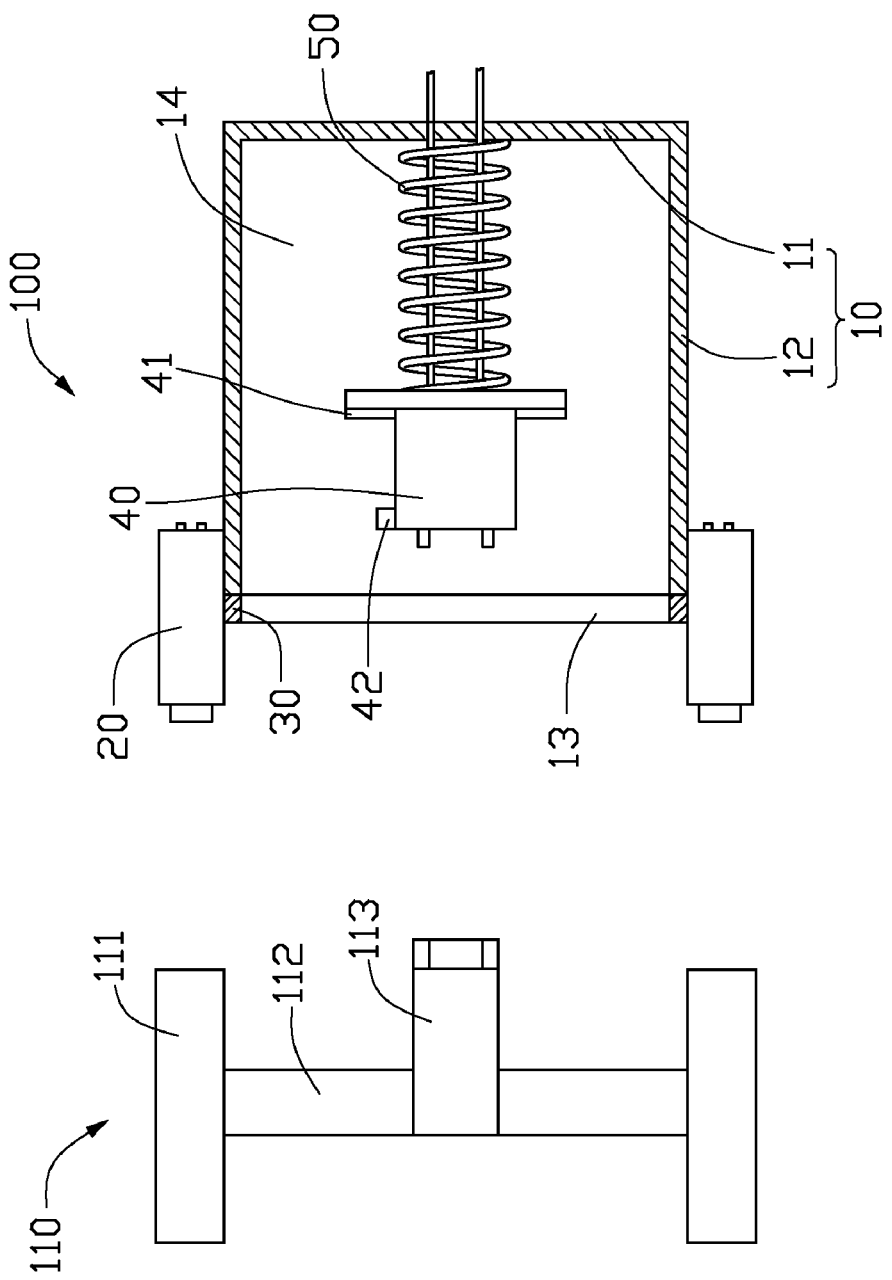
FIG. 1 is a schematic cut-away view of a battery charger having a sensor according to an exemplary embodiment.

Referring to FIG. 1, a battery charger 100 according to an exemplary embodiment is shown. The battery charger 100 can be used for charging a device, such as a robot 110 and so on. In the present embodiment, the robot 110 includes a main body 112, two wheels 111, and a first electrical connector 113.

The battery charger 100 includes a housing 10, sensors 20, a first magnet 30, a second electrical connector 40, and an elastic member 50.

The housing 10 includes a rear wall 11 and a first sidewall 12 attached to the rear wall 11. The rear wall 11 and the first sidewall 12 cooperatively define a receiving space 14 and a first opening 13 communicating with the receiving space 14. The first opening 13 is located at a front end of the housing 10 away from the rear wall 11.

The second electrical connector 40 and the elastic member 50 are received in the receiving space 14 of the housing 10. The elastic member 50 is disposed between the second electrical connector 40 and the rear wall 11 of the housing 10 with two ends thereof fixed to the second electrical connector 40 and the rear wall 11 respectively. The second electrical connector 40 can extend out of the receiving space 14 from the first opening 13 by elongation of the elastic member 50. The second electrical connector 40 includes a second magnet 41 formed thereon. In the present embodiment, the second electrical connector 40 is a plug and the first electrical connector 113 of the robot 110 is a receptacle.

The first magnet 30 is secured at the front end of the housing 10. In the present embodiment, the first magnet 30 is secured on a front end surface of the first sidewall 12 away from the rear wall 11 of the housing 10. At least one of the first magnet 30 and the second magnet 41 of the second electrical connector 40 is an electromagnet. The first magnet 30 and the second magnet 41 cooperatively control the second electrical connector 40 extending out of the housing 10 or being received in the housing 10 by a force applied between the first magnet 30 and the second magnet 41. In the present embodiment, the first magnet 30 is an electromagnet and the second magnet 41 is a permanent magnet. When an attractive force is applied between the first magnet 30 and the second magnet 41, the second magnet 41 is drawn towards the first magnet 30 causing the second electrical connector 40 to extend out of the housing 10 and the elastic member 50 to elongate. When a repulsive force or no force is applied between the first magnet 30 and the second magnet 41, while the second electrical connector 40 is extended, the elastic member 50 will rebound causing the second electrical connector 40 to withdraw into the housing 10.

The at least one sensor 20 is configured for determining whether the first electrical connector 113 of the robot 110 has arrived at a position where the first electrical connector 113 is connectable with the second electrical connector 40 after the second electrical connector 40 has extended out of the housing 10. At the position, the first electrical connector 113 is aligned with the second electrical connector 40, and near enough to the battery charger 100. When the at least one sensor 20 determines that the first electrical connector 113 of the robot 110 has arrived at the position where the first electrical connector 113 is connectable with the second electrical connector 40, the at least one sensor 20 will turn on the first magnet 30 to apply an attractive force between the first magnet 30 and the second magnet 41.

Figure 2:
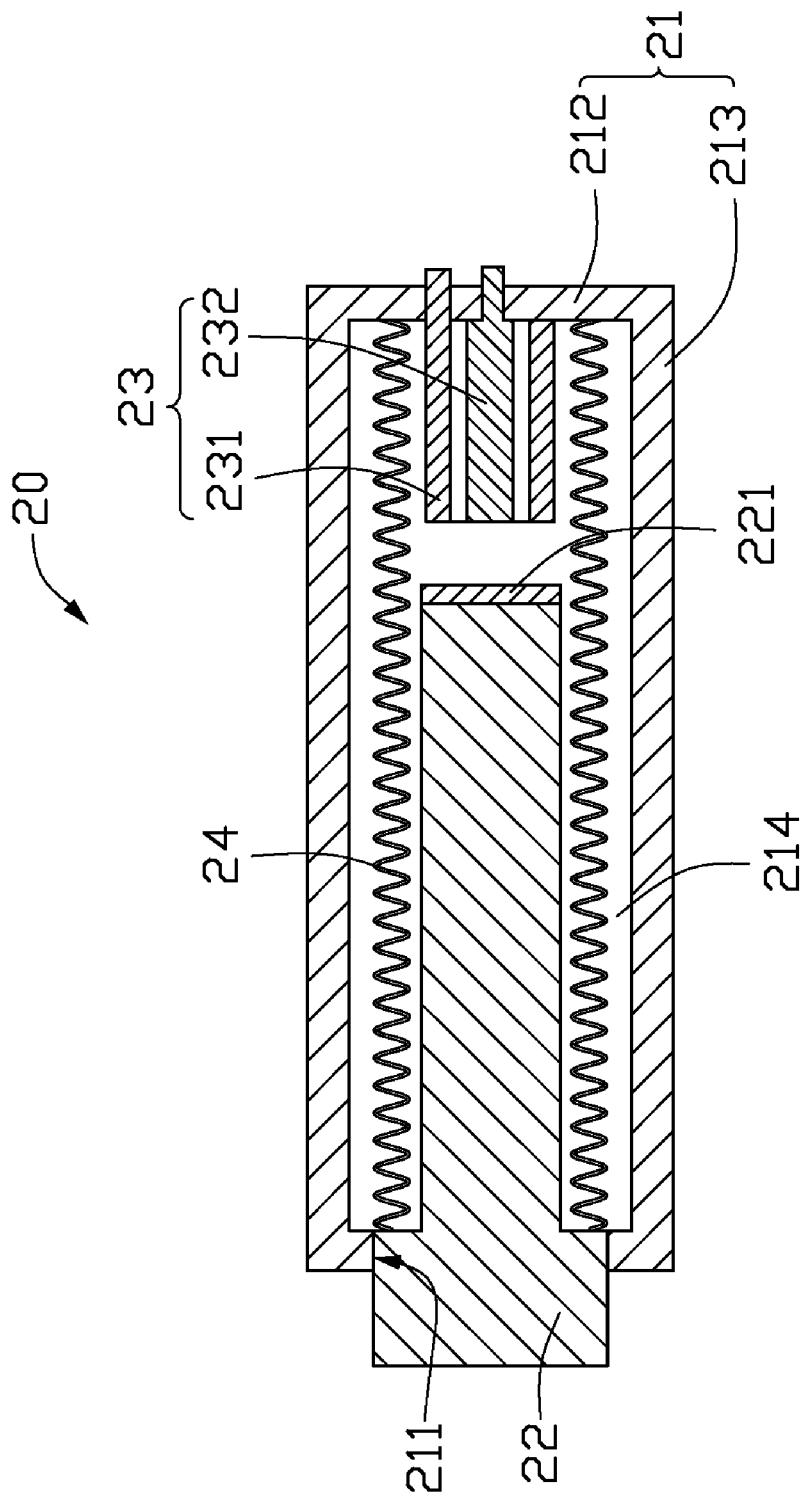
FIG. 2 is a cross-sectional view of the sensor of the battery charger of FIG. 1.

In the present embodiment, the battery charger 100 includes two sensors 20 corresponding to the two wheels 111 of the robot 110. The two sensors 20 are secured on two opposite sides of the first sidewall 12 of the housing 10 respectively. The two sensors 20 and the first magnet 30 are electrically connected in series, so that, the two sensors 20 can turn on or turn off the first magnet 30. Referring to FIG. 2, the sensor 20 includes a casing 21, a pressing portion 22, an electrical connecting portion 23, and an elastic element 24 such as a spring.

The casing 21 includes a bottom wall 212 and a second sidewall 213. The bottom wall 212 and the second sidewall 213 cooperatively define a guiding hole 214 with a second opening 211 thereof opposite to the bottom wall 212. The casing 21 is secured on the two sides of the first sidewall 12 of the housing 10 with the second opening 211 facing away from the rear wall 11 of the housing 10.

The electrical connecting portion 23 is received in the guiding hole 214 and secured on the bottom wall 212 of the casing 21. The electrical connecting portion 23 includes a first conductor 231 and a second conductor 232 separate from the first conductor 231. The pressing portion 22 is partially received in the guiding hole 214 and aligned with the electrical connecting portion 23. The pressing portion 22 has a front end extending out of the guiding hole 214, and a rear end with a conductor layer 221 formed thereon. The elastic element 24 is received in the guiding hole 214 and has an end thereof fixed to the end of the pressing portion 22, which extends out of the guiding hole 214 and the other end thereof fixed to the bottom wall 212 of the casing 21. The conductor layer 221 is normally separated from the electrical connecting portion 23 because of the elastic force of the elastic element 24.

In the present embodiment, when the wheel 111 of the robot 110 presses the front end of the pressing portion 22, the pressing portion 22 will slide towards the electrical connecting portion 23, the conductor layer 221 on the rear end of the pressing portion 22 will connect the first conductor 231 and the second conductor 232 of the electrical connecting portion 23. Once the conductor layer 221 of each sensor 20 is in contact with the corresponding electrical connecting portion 23, the robot 110 has arrived at the position where the first electrical connector 113 is connectable with the second electrical connector 40. Then, the sensors 20 will turn on the first magnet 30 to apply an attractive force between the first magnet 30 and the second magnet 41, and the second electrical connector 40 will extend out of the housing 10 to connect with the first electrical connector 113 of the robot 110 to charge the robot 110.

In the present embodiment, the battery charger 100 further includes a detecting device 42 formed on the second electrical connector 40. The detecting device 42 is configured for detecting current and/or voltage of the robot 110 to determine when or whether the batteries in the robot 110 are fully charged. The detecting device 42 can be a voltage meter for measuring the voltage of the batteries in the robot 110 using technology of prior art. The detecting device 42 can also be a current meter for measuring the current of the second electrical connector 40, when there is no current or much small current flow into the robot 110, that means the robot 110 is fully charged. The detecting device 42, the two sensors 20, and the first magnet 30 are electrically connected in series, thereby, each of the detecting device 42 and the two sensors 20 can turn off the first magnet 30, and the detecting device 42 and the two sensors 20 can cooperatively turn on the first magnet 30. If the detecting device 42 determines that the batteries in the robot 110 are fully charged, the detecting device 42 will turn off the first magnet 30 to remove the attractive force applied between the first magnet 30 and the second magnet 41 causing the second electrical connector 40 to withdraw from first electrical connector 113 of the robot 110 and the connector 40 is retracted into the housing 10.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A battery charger for charging a device with a first electrical connector, comprising:
    a housing defining a receiving space therein and a first opening communicating with the receiving space;
    a second electrical connector received in the receiving space comprising a second magnet formed thereon, the second electrical connector being connected to the housing via an elastic member and capable of extending out of the receiving space from the first opening when the elastic member is elongated;
    a first magnet secured at the front end of the housing adjacent to the first opening, at least one of the first magnet and the second magnet being an electromagnet; and
    one or more sensors secured at the front end of the housing, the one or more sensors being configured for determining whether the device to be charged is in an aligned position where the second electrical connector is connectable with the first electrical connector of the device to be charged, and applying an attractive force between the first magnet and the second magnet when the device to be charged is in the aligned position.

2. The battery charger as claimed in claim 1, wherein the second electrical connector of the battery charger is a plug and the first electrical connector of the device to be charged is a receptacle.

3. The battery charger as claimed in claim 1, wherein the housing comprises a rear wall and a first sidewall surrounding the rear wall, and the first magnet is secured on a front end surface of the first sidewall away from the rear wall of the housing.

4. The battery charger as claimed in claim 3, wherein the one or more sensors are two sensors secured on two opposite sides of the first sidewall of the housing respectively.

5. The battery charger as claimed in claim 4, wherein the device to be charged is a robot which comprises two wheels corresponding to the two sensors.

6. The battery charger as claimed in claim 1, wherein the first magnet is an electromagnet and the second magnet is a permanent magnet.

7. The battery charger as claimed in claim 1, wherein each sensor comprising:
    a casing comprising a bottom wall and a second sidewall, the bottom wall and the second sidewall cooperatively defining a guiding hole with a second opening thereof opposite to the bottom wall;
    an electrical connecting portion secured on the bottom wall of the casing, the electrical connecting portion comprising a first conductor and a second conductor separate from the first conductor;
    a pressing portion aligned with the electrical connecting portion, the pressing portion having a front end extending out of the guiding hole and a rear end with a conductor layer formed thereon capable of electrically connecting the first conductor and the second conductor; and
    an elastic element with an end fixed to the pressing portion and the other end fixed to the bottom wall of the casing.

8. The battery charger as claimed in claim 1, further comprising a detecting device formed on the second electrical connector of the battery charger for detecting the current and/or the voltage input of the device to be charged to determine whether the device is full of energy, and removing the attractive force applied between the first magnet and the second magnet when the device is full of energy.

* * * * *